(12) United States Patent
Conroy (10) Patent No.: US 8,489,560 B1
(45) Date of Patent: Jul. 16, 2013

(54) SYSTEM AND METHOD FOR FACILITATING THE MANAGEMENT OF KEYWORD/UNIVERSAL RESOURCE LOCATOR (URL) DATA

(75) Inventor: Chealsea Conroy, Brooklyn, NY (US)

(73) Assignee: Conductor, Inc., New York, NY (US)

( * ) Notice: Subject to any disclaimer, the term of this patent is extended or adjusted under 35 U.S.C. 154(b) by 0 days.

(21) Appl. No.: 12/877,373

(22) Filed: Sep. 8, 2010

(51) Int. Cl.
*G06F 7/00* (2006.01)
*G06F 17/00* (2006.01)

(52) U.S. Cl.
USPC ........... 707/691; 707/709; 707/759; 707/803; 707/927; 705/14.54; 709/217

(58) Field of Classification Search
USPC ................. 707/709, 723, 748, 927, 691, 759, 707/803; 705/14.54; 709/217
See application file for complete search history.

(56) References Cited

U.S. PATENT DOCUMENTS

| | | | | |
|---|---|---|---|---|
| 2004/0250208 A1* | 12/2004 | Nelms et al. | | 715/533 |
| 2006/0041550 A1* | 2/2006 | Bennett et al. | | 707/5 |
| 2006/0041553 A1* | 2/2006 | Paczkowski et al. | | 707/7 |
| 2006/0179043 A1* | 8/2006 | Ryan et al. | | 707/3 |
| 2007/0128899 A1* | 6/2007 | Mayer | | 439/152 |
| 2007/0233808 A1* | 10/2007 | Egnor et al. | | 709/217 |
| 2008/0066080 A1* | 3/2008 | Campbell | | 719/314 |
| 2008/0140643 A1* | 6/2008 | Ismalon | | 707/5 |
| 2008/0177994 A1* | 7/2008 | Mayer | | 713/2 |
| 2008/0215416 A1* | 9/2008 | Ismalon | | 705/10 |
| 2008/0263025 A1* | 10/2008 | Koran | | 707/5 |
| 2008/0275783 A1* | 11/2008 | Wee et al. | | 705/14 |
| 2009/0070290 A1* | 3/2009 | Nye | | 707/2 |
| 2011/0035780 A1* | 2/2011 | Cedervall et al. | | 725/110 |
| 2011/0295826 A1* | 12/2011 | McLellan | | 707/706 |
| 2011/0313756 A1* | 12/2011 | Connor | | 704/9 |

* cited by examiner

*Primary Examiner* — Phong Nguyen
(74) *Attorney, Agent, or Firm* — Steven S. Rubin, Esq.; Moritt Hock & Hamroff LLP (57) ABSTRACT

Disclosed in a system and method for facilitating the management of keyword/Uniform Resource Locator (URL) data. A first processor receives from a second processor, a request to transmit keyword/URL data. The first processor transmits to the second processor, the keyword/URL data. The first processor receives from the second processor, modified keyword/URL data. The first processor validates the modified keyword/URL data to determine if the modified keyword/URL data includes errors. The modified keyword/URL data can be used to perform keyword ranking using a search engine.

15 Claims, 8 Drawing Sheets

SYSTEM AND METHOD FOR FACILITATING THE MANAGEMENT OF KEYWORD/UNIVERSAL RESOURCE LOCATOR (URL) DATA

BACKGROUND OF THE INVENTION

1. Field of the Invention

This disclosure relates to a system and method for facilitating the management of data related to the generation of a keyword ranking report indicating how a web page may be ranked by a search engine for a keyword.

2. Description of the Related Art

Figure 1:
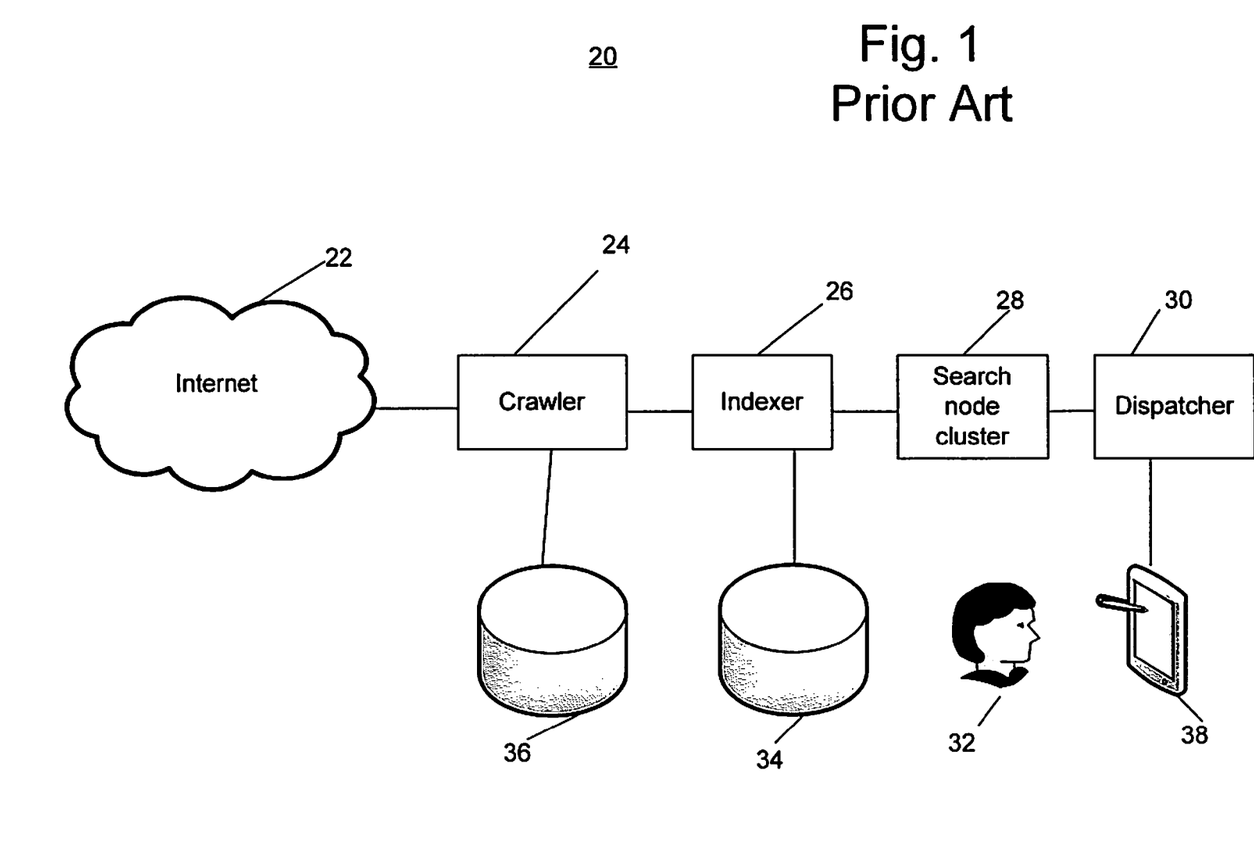
FIG. 1 is a diagram illustrating a search engine in accordance with the prior art.

Referring to FIG. 1, the World Wide Web (WWW) is a distributed database including literally billions of pages accessible through the Internet. Searching and indexing these pages to produce useful results in response to user queries is constantly a challenge. A search engine is typically used to search the WWW.

A typical prior art search engine 20 is shown in FIG. 1. Pages from the Internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 sends a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function.

As discussed above, for each web page, hundreds of features are extracted and a ranking function is applied to those features to produce a ranking score. A merchant with a web page would like his page to be ranked higher in a result set based on relevant search keywords compared with web pages of his competitor for the same keywords. For example, for a merchant selling telephones, that merchant would like his web page to acquire a higher ranking score, and appear higher in a result set produced by a search engine, based on the keyword query "telephone" than the ranking scores of web sites of his competitors for the same keyword.

This disclosure describes an improvement over these prior art technologies.

SUMMARY OF THE INVENTION

One embodiment of the invention is a method for facilitating the management of keyword/Uniform Resource Locator (URL) data, the method includes receiving, by a first processor from a second processor, a request for keyword/URL data; transmitting, by the first processor to the second processor, the keyword/URL data; receiving, by the first processor from the second processor, modified keyword/URL data; and validating, by the first processor, the modified keyword/URL data to determine if the modified keyword/URL data contains at least one error.

Another embodiment of the invention is a system for facilitating the management of keyword/Uniform Resource Locator (URL) data, the system includes a first processor effective to receive from a second processor a request to transmit keyword/URL data, transmit to the second processor the keyword/URL data, receive from the second processor modified keyword/URL data, and validate the modified keyword/URL data to determine if the modified keyword/URL data contains at least one error; and the second processor in communication with the first processor and effective to transmit to the first processor the request to transmit keyword/URL data, receive from the first processor the keyword/URL data, modify the keyword/URL data, and transmit to the first processor the modified keyword/URL data.

Yet another embodiment of the invention is a system for facilitating the management of keyword/Uniform Resource Locator (URL) data, the system includes a memory effective to store keyword/URL data; and a first processor in communication with the memory effective to receive a request to transmit the keyword/URL data, transmit the keyword/URL data, receive modified keyword/URL data, and validate the modified keyword/URL data to determine if the modified keyword/URL data contains at least one error.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Various embodiments of the invention are described hereinafter with reference to the figures. Elements of like structures or function are represented with like reference numerals throughout the figures. The figures are only intended to facilitate the description of the invention or as a limitation on the scope of the invention. In addition, an aspect described in conjunction with a particular embodiment of the invention is not necessarily limited to that embodiment and can be practiced in conjunction with any other embodiments of the invention.

As mentioned above, a processor receives keywords and Uniform Resource Locators (URLs) and sends the keywords to search engines. The processor receives a ranked result set for the keywords from the search engines. The processor then filters the ranked result sets based on the URLs to produce filtered result sets and generates a report based on the keywords and the filtered result sets.

Figure 2:
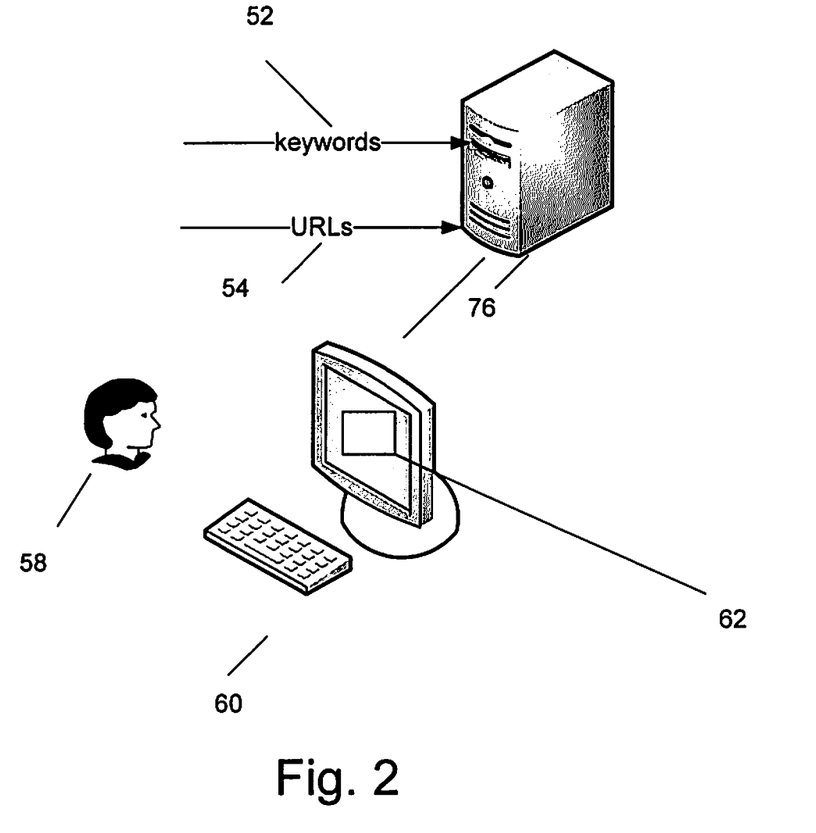
FIG. 2 is a diagram illustrating a system to which an embodiment of the present invention can be applied.

Referring to FIG. 2, there is shown a system 50. A user 58 may provide a set of keywords 52 and a set of URLs 54 to a processor 76. Each keyword 52 could be, for example, one or more characters, symbols and/or words. Processor 76 receives the set of keywords 52 and URLs 54, performs an analysis thereon, and generates a report 62 indicating how the URLs rank in a result set generated by a search engine for set of keywords 52. Report 62 may be displayed to user 58 on a display 60.

Figure 3:
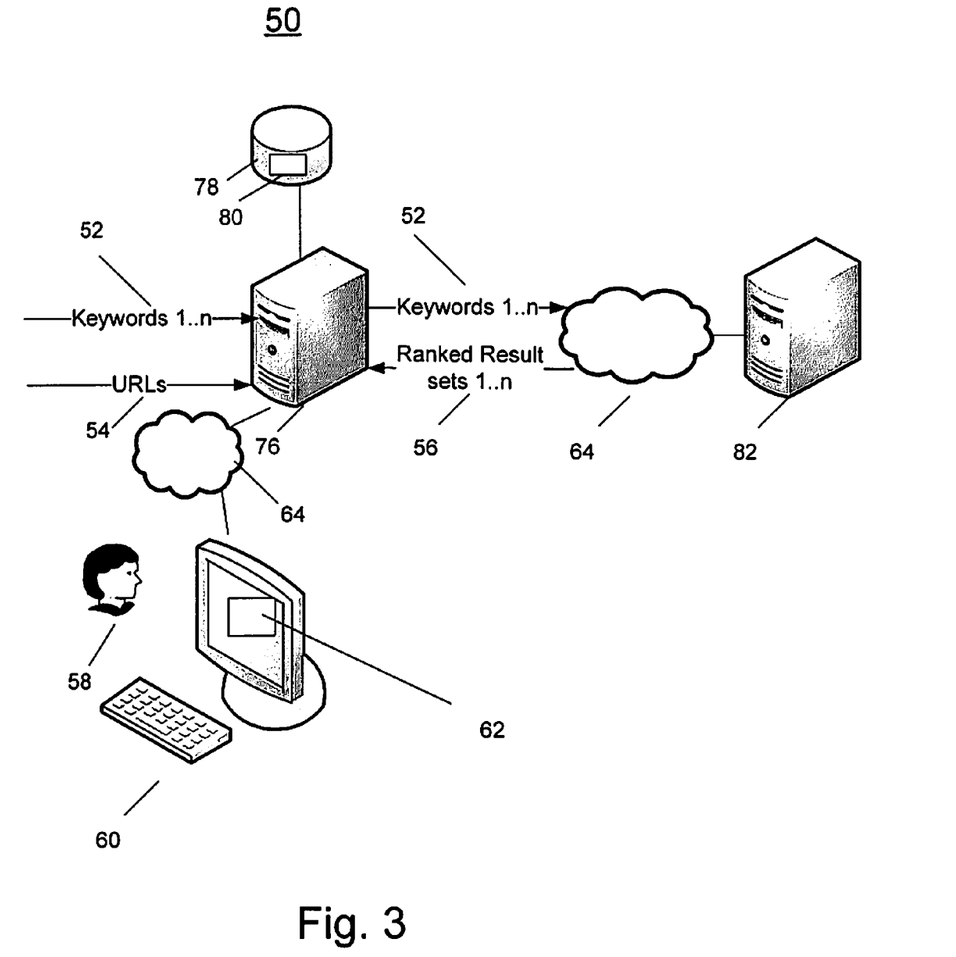
FIG. 3 is a diagram illustrating a system to which an embodiment of the present invention can be applied.

Referring to FIG. 3, there is shown more detail of system 50. As shown, processor 76 may be in communication with user 58 and display 60 over a network 64 such as the Internet. Processor 76 may further be in communication with a memory 78 including instructions 80 and with a search engine 82 over network 64.

Processor 76 may receive set of keywords 52 (n keywords are shown) and URLs 54 from user 58. Set of keywords 52 could include, for example, keywords relevant to a business and/or web site owned by user 58. For example, set of keywords 52 could be a set of the 25 most popular keywords relating to a business of user 58. A monthly search volume of a particular search engine 82 could be used to help generate set of keywords 52.

Processor 76 may send each keyword in set of keywords 52 over a network 64 to a search engine 82 and may receive ranked result sets 56 from the search engine. Processor 76 may filter the ranked result sets 56 based on URLs 54 to generate filtered result sets for report 62 to be stored in memory 78 and/or displayed on display 60. Report 62 may be based on a single search engine 82 and/or may include results from multiple search engines.

The inventors have learned that each keyword along with an associated URL, i.e. a keyword/URL pair, needed to be manually input and entered into processor 76. These keyword/URL pairs could comprise a list of thousands or tens of thousands individual entries. One method for entering these keyword/URL pairs into processor 76 was for a user to individually supply the keyword/URL pairs to a system account manager. The system account manager needed to review and validate the keyword/URL pairs and then manually enter the keywords and URLs into processor 76. This process was time consuming and burdensome on the user and the system account manager.

Figure 4:
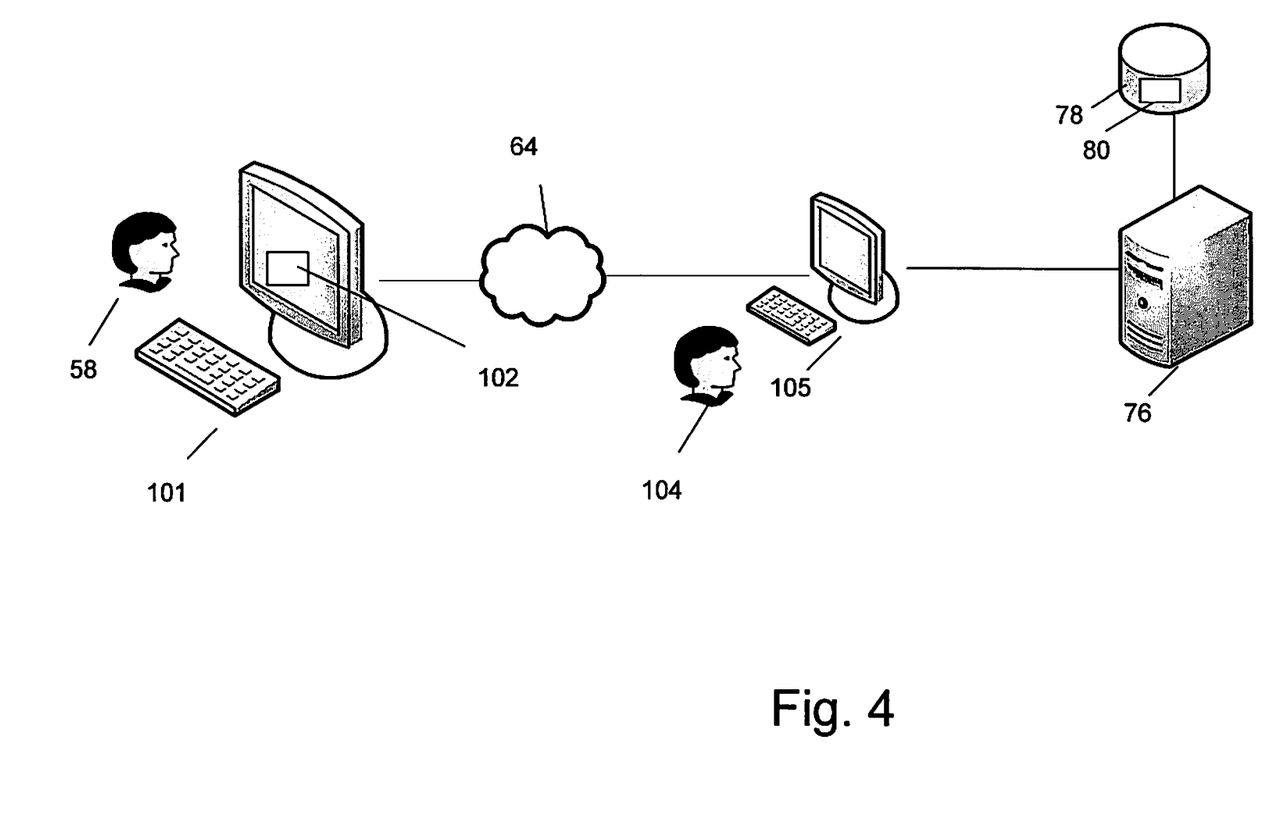
FIG. 4 is a diagram illustrating a system for facilitating the management of keyword/URL data according to an embodiment of the present invention.

Referring to FIG. 4, user 58 enters the keyword/URL data into a spreadsheet 102 using a spreadsheet program (e.g. MICROSOFT EXCEL) on processor 101. The format of the keyword/URL data will be described in further detail below with respect to FIG. 8, and in general include a keyword field, a URL field, a category field, and an active/inactive field. User 58 transmits, through network 64, the keyword/URL data in the spreadsheet to a processor 105 of a system account manager 104. In the alternative, a computer algorithm can be utilized in place of system account manager 104. System account manager 104 (or computer algorithm) reviews and validates the keyword/URL data in a validation process in processor 104. System account manager 104 (or computer algorithm) stores the keyword/URL data in memory 78 of processor 76.

Figure 5:
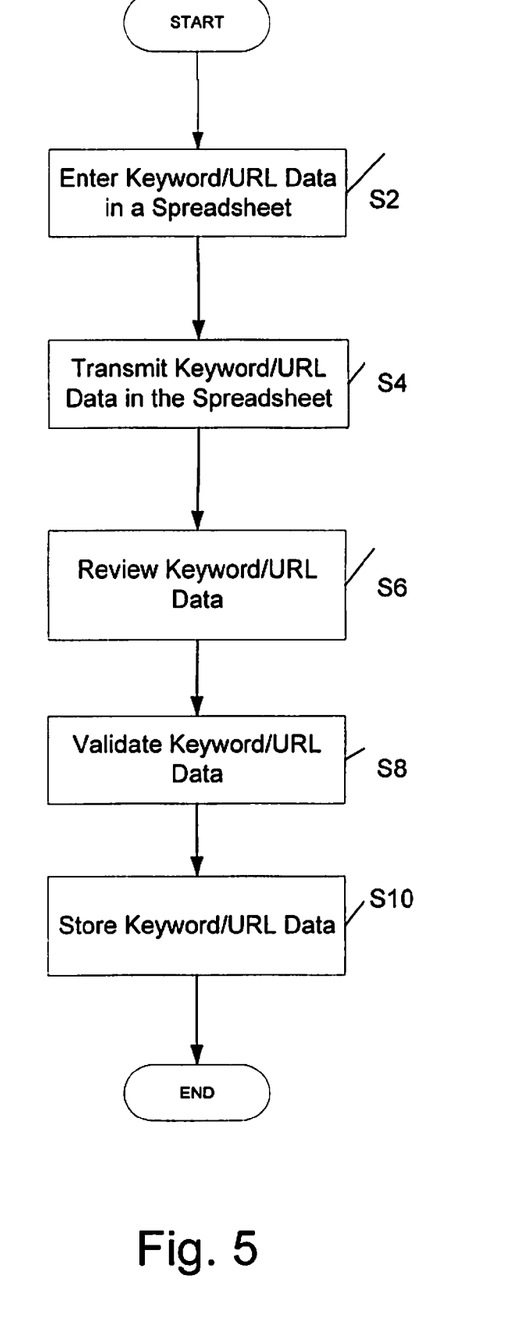
FIG. 5 is a flow chart illustrating a method for facilitating the management of keyword/URL data according to an embodiment of the present invention.

Referring to FIG. 5, there is shown a process which could be performed in accordance with an embodiment of the invention. The process could be performed with, for example, system 50 discussed above. In step S2 a user enters the keyword/URL data into a spreadsheet using a spreadsheet program (e.g. MICROSOFT EXCEL). In step S4 the user transmits, through a network, the keyword/URL data in the spreadsheet to a computer of a system account manager. In step S6 the system account manager (or computer algorithm) reviews the keyword/URL data. In step S8, the system account manager (or computer algorithm) validates the keyword/URL data. The validation process will be described in more detail with respect to FIGS. 6 and 7. In step S10 the system account manager (or computer algorithm) stores the keyword/URL data in the memory.

In general, after processor 76 generates the filtered result sets and generates a report (62—in FIG. 3), the report may be analyzed by user 58. Alternatively, user 58 may determine that a modification of the keyword/URL data is desired based on other factors. Either way, user 58 may desire to modify the keyword/URL data and submit modified keyword/URL data for further analysis by processor 76.

Figure 6:
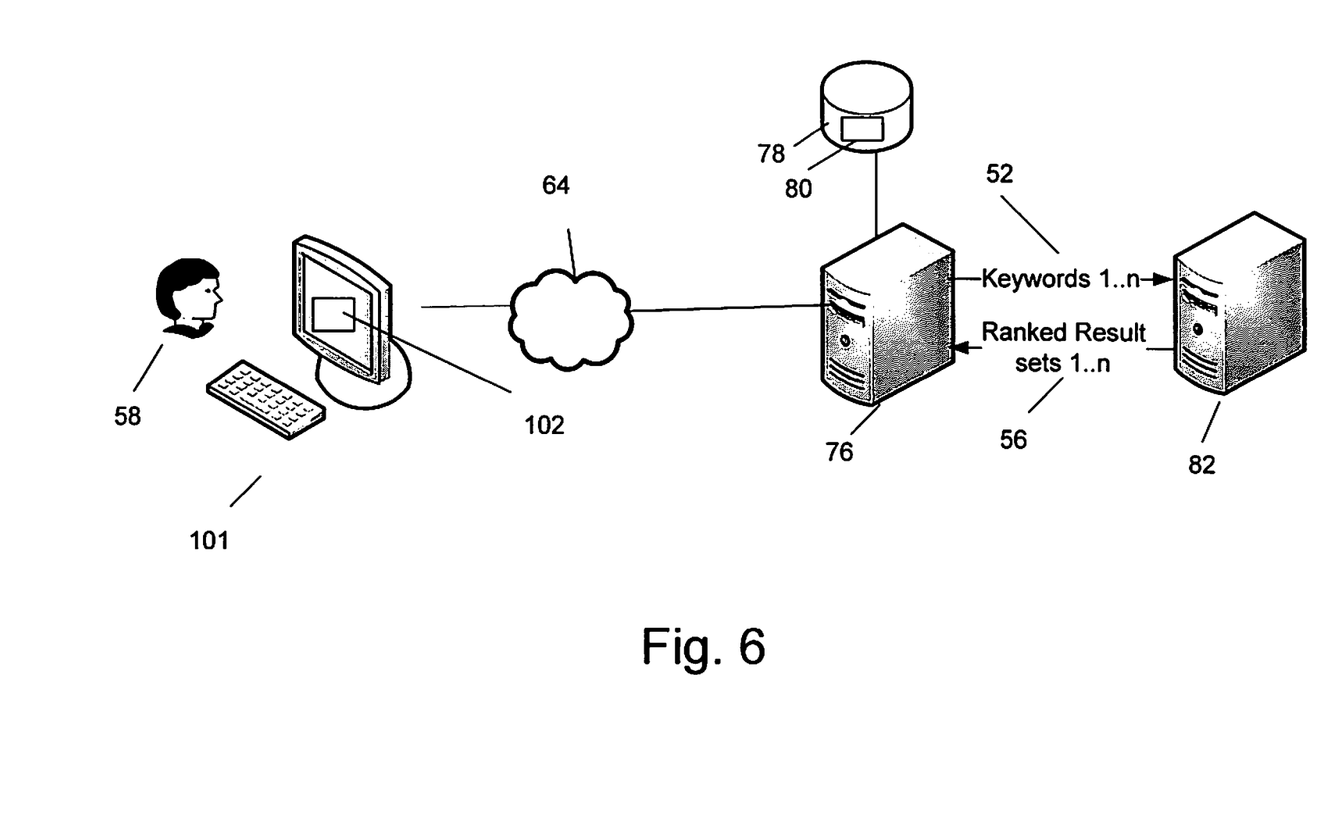
FIG. 6 is a diagram illustrating a system for facilitating the management of existing keyword/URL data according to an embodiment of the present invention.

Referring to FIG. 6, after the initial entry process of the keyword/URL data described in FIGS. 4 and 5, user 58 sends to processor 76 a request to transmit the keyword/URL data stored in memory 78 to user 58. Processor 76 receives from processor 101 the request from user 58 to transmit the keyword/URL data. Processor 76 transmits to processor 101 the keyword/URL data, in, for example, the spreadsheet format. Processor 101 receives the keyword/URL data. User 58 modifies the keyword/URL data to produce modified keyword/URL data.

The modification process can include changing the keyword/URL data. The changing can be to any of the fields of the keyword/URL data—for example any of the fields described with respect to FIG. 8. That is, the user can change the contents of the keyword field, the URL field, the category field, and the active/inactive field. In addition, the user can add new keyword/URL data by entering a value for each of the keyword field, the URL field, the category field, and/or the active/inactive field. As the keyword/URL data is available for modification by the user in a spreadsheet format, the user can manage and manipulate data easily and more powerfully than some prior art methods. For example, a user can manage entire categories of data by, for example, sorting by the category field.

User 58 transmits the modified keyword/URL data back to processor 76. Processor 76 receives the modified keyword/URL data and processor 76 performs a validation process on the modified keyword/URL data. During the validation process, processor 76 checks the keyword/URL data for errors. These errors can include, but are not limited to, illegal characters such as, for example, the characters inside the following parenthetical (/ < > { } | \ ˆ [ ] ' "' :), formatting errors such as when a user requests to track a URL distinct from URLs already being tracked by the user, duplications in keyword/URL pairs, and empty fields in the keyword/URL data. If errors exist in the keyword/URL data, processor 76 marks or highlights the keyword/URL data to identify the errors. Processor 76 transmits the marked keyword/URL data containing the identified errors to processor 101. The marked keyword/URL data is received at processor 101 and can be modified by user 58 to correct the errors.

If during the validation process, processor 76 determines that errors do not exist in the keyword/URL data, processor 76 saves the keyword/URL data in memory 78. Processor 76 can inform user 58 that the keyword/URL data does not contain errors. The saved keyword/URL data can then be used by processor 76 to perform further analysis and/or perform further keyword ranking using search engine 82.

Figure 7:
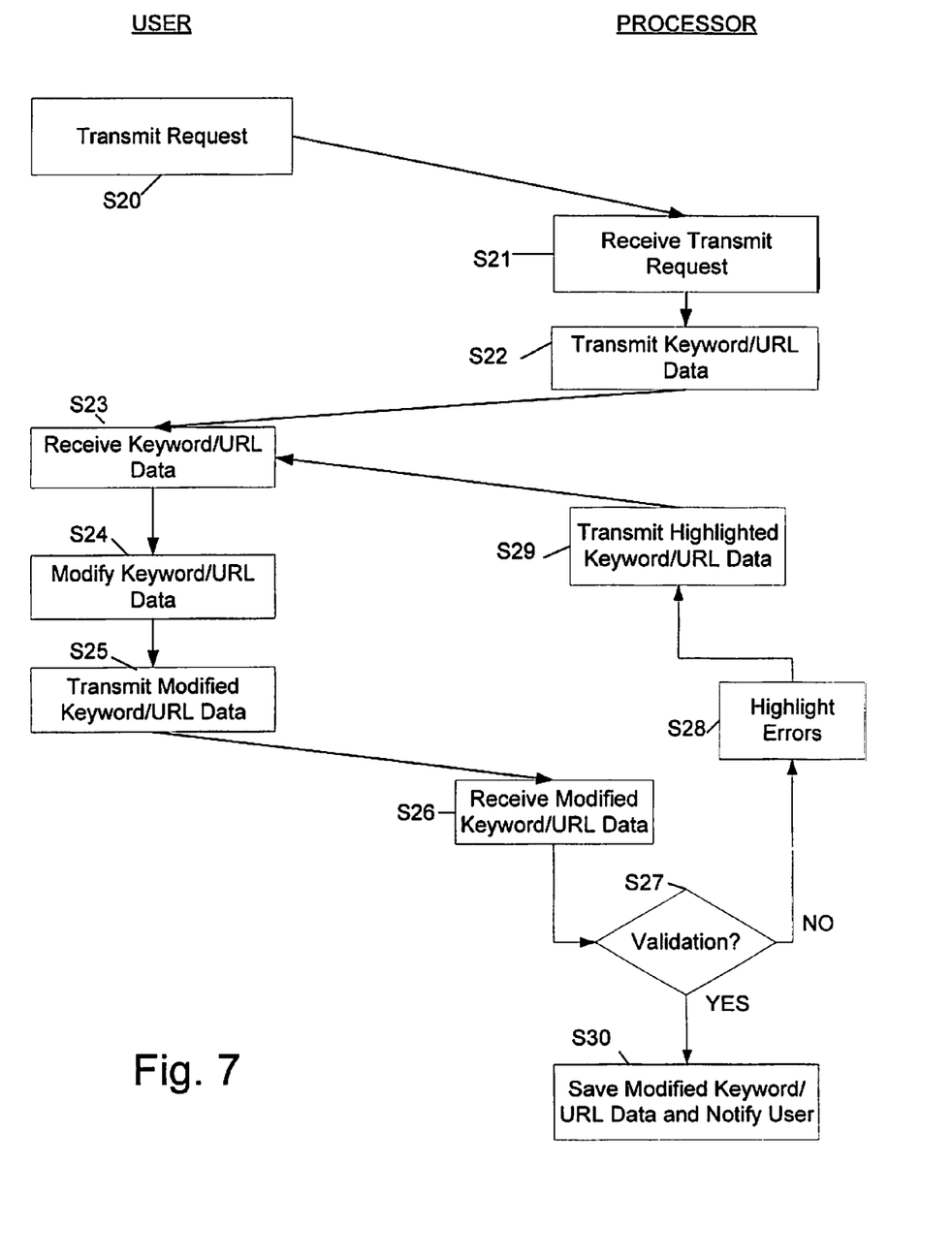
FIG. 7 is a flow chart illustrating a method for facilitating the management of existing keyword/URL data according to an embodiment of the present invention.

Referring to FIG. 7, there is shown a process which could be performed in accordance with an embodiment of the invention. The process could be performed with, for example, system 50 discussed above. After the initial entry process of the keyword/URL data described in FIGS. 4 and 5, in step S20 the user sends to the processor a request to transmit the keyword/URL data stored in the memory to the user. In step S21 the processor receives from the user the request to transmit the keyword/URL data, in, for example, the spreadsheet format. In step S22 the processor transmits to the user the keyword/URL data. In step S23 the user receives the keyword/URL data. In step S24 the user modifies the keyword/URL data to produce modified keyword/URL data. In step S25 the user transmits the modified keyword/URL data back to the processor. In step S26 the processor receives the modified keyword/URL data. In step S27 the processor performs a validation process on the modified keyword/URL data.

During the validation process, the processor checks the modified keyword/URL data for errors. As explained above, these errors can include, but are not limited to, illegal characters in the keyword/URL data, illegal characters in the keywords, errors in the format of a URL, and duplicate keyword/URL pairs. If errors exist in the modified keyword/URL data, in step S28 the processor marks or highlights the modified keyword/URL data to identify the errors. In step S29 the processor transmits the marked keyword/URL data to the user. The marked keyword/URL data is received by the user and can, in step S23, again be modified by the user to correct the errors.

If during the validation process of step S27, the processor determines that errors do not exist in the modified keyword/URL data, in step S30 the processor stores in the memory the modified keyword/URL data. The processor can inform the user that the modified keyword/URL data does not contain errors. The saved keyword/URL data can then be used to perform further analysis by the processor.

Figure 8:
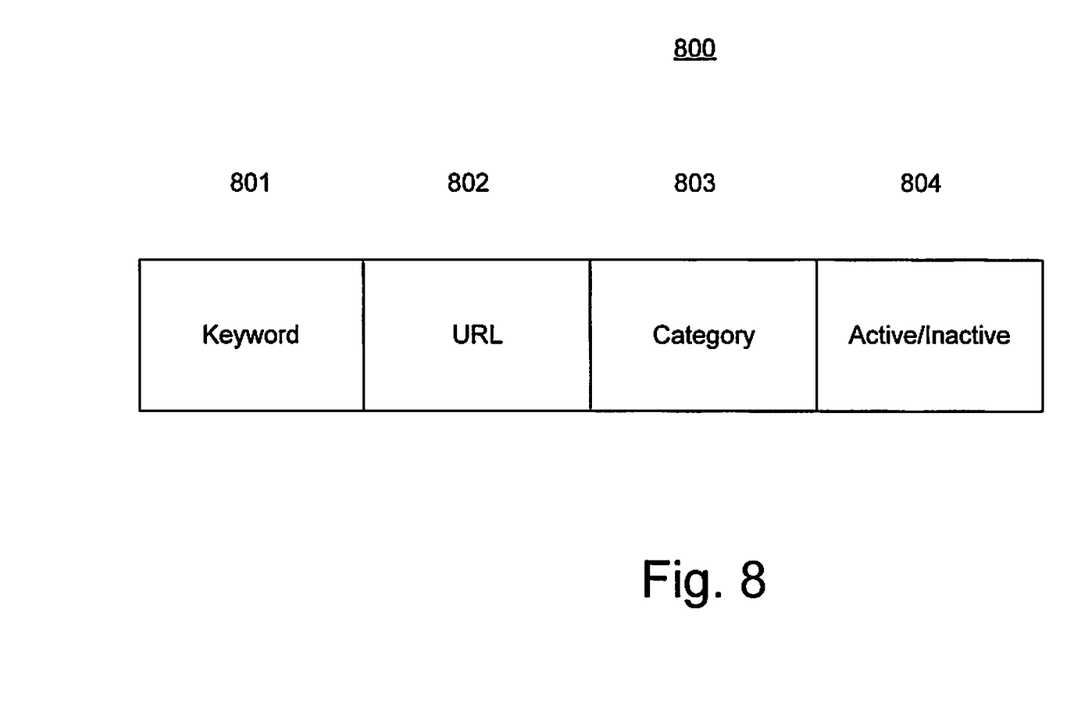
FIG. 8 is a diagram illustrating a format of keyword/URL data according to an embodiment of the present invention.

FIG. 8 is a diagram illustrating an example of a format of the keyword/URL data. As described above, the data transmitted between user 58 and processor 76 may be formatted as shown in FIG. 8. The data format includes a keyword field 801, a URL field 802, a category field 803, and an active/inactive field 804. Keyword/URL data may include plurality of line item entries, each having the format shown in FIG. 8. Keyword field 801 contains the keyword to be analyzed. URL field 802 contains the URL associated with the keyword to be analyzed. Category field 803 contains a category identifier to identify a category for the keyword contained in keyword field 801.

The category identifier can be used by user 58 to sort and/or filter the keyword/URL data. The category identifier can also be used to assist in the modification of the keyword/URL data by enabling the user to sort and/or filter the keyword/URL data. The active/inactive field 804 contains an active/inactive indicator that indicates whether or not the particular keyword/URL pair should be processed during an analysis by processor 76. That is, the active/inactive indicator acts as an on/off switch for the associated keyword/URL pair. All the fields in the data format can be modified by a user during the modification process described above.

As can be seen, the system and method disclosed herein saves time and resources for a user and system account manager. In the system and method, a user can receive, modify and transmit keyword/URL data. The system account manager need not be involved in the management process.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for facilitating the management of keyword/Uniform Resource Locator (URL) data, the method comprising:
   receiving, by a first processor from a second processor, a request for a set of keywords and associated URLs;
   transmitting, by the first processor to the second processor, the set of keywords and associated URLs;
   receiving, by the first processor from the second processor, a modified set of keywords and associated URLs; and
   reviewing and validating, by the first processor, the set of keywords and associated URLs to determine if the modified set of keywords and associated URLs includes at least one error, wherein the validation comprises checking the set of keywords and associated URLs for illegal characters or checking the set of keywords and associated URLs for formatting errors in the format of a URL, and
   wherein the set of keywords and associated URLs includes a keyword field containing a keyword, a URL field containing a URL associated with the keyword, a category field containing a keyword category identifier, and an active/inactive field containing an active/inactive indicator.

2. The method of claim 1, further comprising:
   sending, by the first processor, a particular keyword in the modified set of keywords and associated URLs to a search engine;
   receiving, by the first processor, a result set from the search engine; and
   ranking, by the first processor, a URL associated with the particular keyword based on the result set.

3. The method of claim 1, further comprising:
   if the modified set of keywords and associated URLs includes at least one error, marking the modified set of keywords and associated URLs to identify at least one error to create a marked set of keywords and associated URLs, and transmitting, by the first processor to the second processor, the marked set of keywords and associated URLs; and
   if the modified set of keywords and associated URLs does not include at least one error, saving, by the first processor, the modified set of keywords and associated URLs.

4. The method of claim 1, wherein the request is received from a user.

5. The method of claim 1, wherein the set of keywords and associated URLs is modified by a user by changing at least one field of the set of keywords and associated URLs or adding at least one additional keyword and associated URL.

6. The method of claim 3, wherein a user modifies the marked set of keywords and associated URLs and transmits the modified marked set of keywords and associated URLs to the first processor through the second processor.

7. A system for facilitating the management of keyword/Uniform Resource Locator (URL) data, comprising:
   a first processor effective to
      receive from a second processor a request to transmit a set of keywords and associated URLs,
      transmit to the second processor the set of keywords and associated URLs,
      receive from the second processor a modified set of keywords and associated URLs, and
      review and validate the modified set of keywords and associated URLs to determine if the modified set of keywords and associated URLs includes at least one error, wherein the validation comprises checking the set of keywords and associated URLs for illegal characters or checking the set of keywords and associated URLs for formatting errors in the format of a URL, and wherein the set of keywords and associated URLs includes a keyword field containing a keyword, a URL field containing a URL associated with the keyword, a category field containing a keyword category identifier, and an active/inactive field containing an active/inactive indicator; and the second processor in communication with the first processor, the second processor effective to transmit to the first processor the request to transmit the set of keywords and associated URLs, receive from the first processor the set of keywords and associated URLs, modify the set of keywords and associated URLs to produce modified set of keywords and associated URLs, and transmit to the first processor the modified set of keywords and associated URLs.

8. The system of claim 7, wherein the first processor is effective to send a particular keyword in the modified set of keywords and associated URLs to a search engine;

receive a result set from the search engine; and rank a URL associated with the particular keyword based on the result set.

9. The system of claim 7, wherein if the modified set of keywords and associated URLs includes at least one error, the first processor is effective to mark the modified set of keywords and associated URLs to identify at least one error to create a marked set of keywords and associated URLs, and transmit to the second processor the marked set of keywords and associated URLs, and if the modified set of keywords and associated URLs includes no errors, the first processor is effective to save the modified set of keywords and associated URLs.

10. The system of claim 7, wherein the set of keywords and associated URLs is modified by a user by changing at least one field of the set of keywords and associated URLs or adding at least one additional keyword and associated URL.

11. The system of claim 9, wherein a user modifies the marked set of keywords and associated URLs to create modified marked set of keywords and associated URLs and transmits the modified marked set of keywords and associated URLs to the first processor through the second processor.

12. The system of claim 7, wherein the second processor is effective to modify the set of keywords and associated URLs by being effective to sort the set of keywords and associated URLs by a category.

13. A system for facilitating the management of keyword/Uniform Resource Locator (URL) data, the system comprising:

a memory effective to store a set of keywords and associated URLs; and a first processor in communication with the memory, the first processor effective to receive a request to transmit the set of keywords and associated URLs, transmit the set of keywords and associated URLs, receive a modified set of keywords and associated URLs, and review and validate the modified set of keywords and associated URLs to determine if the modified set of keywords and associated URLs includes at least one error, wherein the validation comprises checking the set of keywords and associated URLs for illegal characters or checking the set of keywords and associated URLs for formatting errors in the format of a URL, and wherein the set of keywords and associated URLs includes a keyword field containing a keyword, a URL field containing a URL associated with the keyword, a category field containing a keyword category identifier, and an active/inactive field containing an active/inactive indicator.

14. The system of claim 13, wherein the first processor is effective to send a particular keyword in the modified set of keywords and associated URLs to a search engine;

receive a result set from the search engine; and rank a URL associated with the particular keyword based on the result set.

15. The system of claim 13, wherein if the modified set of keywords and associated URLs includes at least one error, the first processor is effective to mark the modified set of keywords and associated URLs to identify the error and create a marked set of keywords and associated URLs, and transmit the marked set of keywords and associated URLs, and if the modified set of keywords and associated URLs does not include at least one error, the first processor is effective to save the modified set of keywords and associated URLs.

* * * * *